Patented Jan. 31, 1950

2,496,234

UNITED STATES PATENT OFFICE 2,496,234

ABRASIVE ARTICLES AND METHODS OF MANUFACTURING THE SAME

Norman P. Robie, Lewiston, N. Y., assignor to The Carborundum Company, Niagara Falls, N. Y., a corporation of Delaware No Drawing. Application May 15, 1944, Serial No. 535,732

6 Claims. (Cl. 51—298)

This invention relates to abrasive articles and to methods of manufacturing the same. The invention is particularly concerned with the production of such articles in which the bond comprises a resin formed by the polymerization of an esterification product of a polybasic acid with an unsaturated alcohol.

The invention is useful in the production of various types of abrasives, including both the coated abrasives commonly referred to as "sandpaper" and the bonded articles represented by abrasive wheels or stones. It is particularly well adapted for the production of very dense bonded articles which are substantially free from pore spaces and consist of the abrasive material and the resin bond in the form of a dense, very uniform solid mass. Articles of this type have a particular utility in the field of fine finishing and in cases where it is desired that the abrasive article shall maintain its grinding face during the grinding operation, as for example, in the field of thread grinding. However, by employing certain modifications of the invention, more open and porous abrasive articles may also be produced, as will be described in detail hereinafter.

The resin which has most commonly heretofore been used in the manufacture of abrasive articles is the phenol aldehyde type of condensation product represented by the resins sold under the trade name "Bakelite." These resins have been found to be very satisfactory for many purposes but there are certain limitations attached to their use which limit their utility. For example, during the final heat treatment of the molded article to cure or convert the resin to the final, infusible, insoluble condition, gases are generated and it is necessary to provide a certain amount of porosity in the article to prevent swelling and bloating which occur if the articles are too dense. Consequently, this limits the density of the completed articles which it is possible to make with the phenolic type of resins. Likewise, the resins require a somewhat prolonged heat treatment at elevated temperatures in order to bring out their ultimate strength. Furthermore, in making the molded articles it is necessary to make the resin plastic if the articles are to be cold molded, as most of them are, and this plasticity is commonly imparted by the introduction of a liquid wetting agent. The wetting agents are usually applied to the abrasive grain followed by mixing with the powdered resin, and molding. Where liquid resins are used as the wetting agents there is a still further amount of volatile matter to be removed since the liquid resins are not so far advanced as the powdered resins and consequently contain more unreacted and volatile material. Alternatively, aldehydes such as furfural have been used for wetting agents, but the furfural either volatilizes or probably in part reacts with the phenol of the phenol formaldehyde condensation product and thereby modifies the phenol formaldehyde resin.

Another method of bonding with phenolic resin is to mix finely powdered reactive powder with very finely powdered abrasive and cure the mixture under heat and pressure. While this method uses a minimum of volatile materials, uniformity of distribution of the abrasive in the bond powder is difficult to obtain due to aggregations of particles. This lack of uniformity causes the articles to load with metal and abrade unsatisfactorily.

In addition, there are certain limitations to the combination of properties such as tensile strength, elasticity, and toughness which can be obtained with the phenol type resins. Abrasive articles are employed for a great many purposes and it is desirable to have bonds containing different combinations of physical properties. The phenolic resins cannot be made with all the desirable combinations of such properties.

It is accordingly an object of the present invention to provide improved abrasive articles containing a resin bond and methods of making such articles. Another object of the present invention is the provision of a bond for abrasives which can be converted from the liquid condition to the final infusible stage without the generation of any volatile matter. Another object of the invention is to provide very dense abrasive articles. Another object of the invention is to provide an abrasive article wherein the very fine abrasive particles are very uniformly dispersed in the bonding medium. Another object of this invention is to provide bonds for abrasive articles from monomers of practically no volatility under normal hardening conditions. Still another object of the invention is the provision of abrasive articles in which the bond has certain desirable combinations of physical properties not obtainable by the use of resins of the prior art.

I have found that abrasive articles which are very satisfactory for many purposes can be produced by employing as the binder the polymerization product of an unsaturated ester formed by the esterification of a polycarboxylic acid with an unsaturated alcohol. An example of such an ester is diallyl phthalate, which is the esterification product of allyl alcohol with phthalic anhydride. Many other unsaturated alcohols and many other polycarboxylic acids can be employed, including mixtures of different esters. In consequence, it is possible to produce abrasive articles having quite different combinations of properties brought about by the different combination of physical properties obtained in the polyesters or mixtures thereof.

The resins of my invention are made by first forming a monomeric ester by any of a number of conventional methods and then polymerizing the ester. During the esterification reaction water is formed by reason of the condensation between the hydrogen of the carboxyl (COOH) group of the acid and the hydroxyl (OH) group of the alcohol. This water of condensation is removed from the monomeric esters and there is thereby obtained an unsaturated compound containing two or more double bonds. The resins are formed by polymerization at these double bonds without the production of any by-product material and consequently the final curing of the resin is unaccompanied by the evolution of any gases. This feature makes it possible to obtain very dense articles.

Because the monomeric esters are high boiling liquids of low volatility and there is no volatile matter evolved during the polymerization reaction which brings about the final hardening it is possible to cast abrasive articles with my new binders by suspending the abrasive material in the liquid monomeric material and polymerizing the monomer. Such articles are substantially free from pores and have utility in a number of applications, as have been heretofore mentioned.

Alternatively, I may partially polymerize the unsaturated esters and obtain a brittle, grindable solid which can be reduced to a powder and employed to make the more open and porous type of articles by a method similar to that described in connection with the production of the phenol resin bonded articles.

The resins of my invention are also very well adapted to the manufacture of coated abrasives of the type commonly referred to as "sandpaper." In making such products a suitable backing material such as paper or cloth is first coated with a liquid adhesive and then with a layer of abrasive grains applied to the adhesive-coated surface. This liquid adhesive is caused to solidify and it is the almost invariable practice to apply a second coat of liquid over the abrasive grains to additionally anchor them to the backing material. An alternative method of making the coated abrasives where the abrasive material is in finely divided condition consists in suspending the fine abrasive in the liquid and applying the mixture of liquid adhesive and abrasive material to the backing followed by treatment to solidify the liquid. My unsaturated esters are especially well adapted for this purpose because they are, or can be made, sufficiently sticky and tacky to pick up the abrasive grain and, as stated, they can be advanced to the infusible condition without any difficulty from the formation of volatile matter which sometimes tends to make the adhesive coating spongy and porous.

An additional feature of my invention, which is particularly useful in the manufacture of coated abrasives, is the employment of polymerization inhibitors in the coating liquids. The unsaturated esters polymerize spontaneously, although not so rapidly as to cause any particular difficulty, and such polymerization can be prevented by the addition of inhibitors. I have found that certain relatively low boiling compounds assert an inhibiting effect on the polymerization. Consequently the viscosity of the liquid adhesive coating composition used in making the coated abrasives can be kept substantially constant by including inhibitors and yet when the adhesive is applied to the surface the inhibitors volatilize during the first part of the heat-treatment, thereby allowing the unsaturated esters to polymerize and heat-harden. This feature is of particular advantage because it is frequently the custom to apply the liquid adhesive in a heated condition in order to obtain an increase in viscosity by cooling the product. Since polymerization is accelerated by an elevation in temperature, considerable difficulty is experienced with phenolic resins because they tend to react and become more viscous when they are heated for application to the backing. This difficulty is obviated in my invention because the inhibitor prevents any increase in viscosity by reason of reaction in the vessel from which the adhesives are transferred to the backing material. It is therefore possible to reproduce products much more satisfactorily because the amount of abrasive grain that is stuck onto the adhesive coated backing is determined to some extent by the viscosity of the liquid adhesive.

One specific material which I have found to be very satisfactory for the manufacture of many types of abrasive articles is diallyl phthalate. This compound is available commercially and can be made by a number of processes. One method consists in reacting allyl alcohol with phthallyl chloride in the proportion of 2 mols of the alcohol to 1 mol of the chloride since the phthallyl chloride contains, in effect, two reactive acid groups and the allyl alcohol is a monohydric alcohol.

Another method of producing the ester is by an ester interchange reaction between the ester of a saturated alcohol and the unsaturated alcohol. For example, dimethyl phthalate may be reacted with allyl alcohol to produce the diallyl phthalate and methyl alcohol which is relatively low-boiling and can be easily removed from the comparatively high-boiling diallyl phthalate.

Still another method of producing the esters is by the reaction of an unsaturated alcohol with an acid chloride. For example slightly more than two mols of methyl vinyl carbinol were reacted with one mol of fumaryl chloride to make the unsaturated ester dimethyl vinyl carbinyl fumarate.

The following example illustrates the manufacture of a honing wheel suitable for grinding die steel.

Example I 2.1 grams of benzoyl peroxide was mixed into 70 grams of diallyl phthalate monomer. The mixture was heated to 50° C. to bring the peroxide into solution and 155 grams of finely divided abrasive powder was stirred into the liquid ester. The abrasive powder was a calcined alumina sold by The Carborundum Company under the designation "KHM." The mix was poured into a mold ½-inch in diameter and a steel spindle with a knurled end was centered in the mold. The mold and its contents were then heated to harden the mix about the spindle according to the following schedule:

160° F.—16 hours (overnight)
170° F.— 2 hours (overnight)
180° F.— 3 hours (overnight)
190° F.— 3 hours (overnight)

The wheel was removed from the mold and trued up to provide an internal honing wheel ½-inch in diameter by ½-inch long. The finished wheel, when rotated in a high-speed air grinder at about 50,000 R. P. M., noticeably abrades high carbon die steel, removing a substantial amount of stock while giving a good finish without loading or smearing.

The resins may be modified by copolymerization or admixture with other resin forming materials to modify the properties for specific purposes. In the manufacture of coated abrasive products an adhesive is required which is very sticky and which may be varied over a range of viscosities. Further it is advantageous to have the adhesive non-volatile to prevent loss of resin forming monomer. The following two examples describe an adhesive of this nature wherein the diallyl phthalate is blended with an uncured soluble unsaturated polyester to give a viscous sticky coating adhesive.

Example II 159 parts diethylene glycol was heated with stirring in a $CO_2$ atmosphere with 132 parts maleic anhydride. One hour was required to heat the mixture from room temperature to 200° C. and this temperature was maintained for two hours.

200 parts of the above unsaturated alkyd resin was dissolved with 60 parts of diallyl phthalate and 2.0 parts of benzoyl peroxide were dissolved in the solution.

Abrasive discs were made by coating 9" discs, of .010" thick vulcanized fiber laminated with drill cloth, with 10 grams of the solution and distributing 70 grams of 24 grit fused alumina over the adhesive. This coating was then baked 25 minutes at 175° F. followed by 30 minutes at 200° F. The grain coating was then sized with the above adhesive thinned with an equal part of acetone and recured 1 hour at 200° F. followed by 3 hours at 225° F. The resulting disc was a very tough flexible abrasive product very satisfactory for abrading wood.

Example III

Unsaturated alkyd resin was prepared as in Example II. A viscous sticky adhesive was prepared by dissolving ten pounds of unsaturated alkyd resin in five pounds of diallyl phthalate containing 0.1 pound of benzoyl peroxide dissolved therein at 70° C.

The above adhesive was coated on 130# cylinder paper to size the surface of the paper. The paper was baked 1½ hours at 300° F. to cure the size. A second application of adhesive was coated on the sized paper and 80 grit silicon carbide was spread uniformly over the surface. The coated paper was cured at 275° F. for four hours. The grain coating was then sized with a light application of adhesive and the completed coating cured again at 275° F. for four hours.

The adhesive cures to a very strong, hard, adherent film. It is desirable to very lightly presize the paper surface to prevent subsequent applications of adhesive from soaking through the cellulosic backing and embrittling the same.

In the two previous examples I have used an uncured unsaturated alkyd to impart viscosity and stickiness to the coating solutions. Alternatively I may use a partially polymerized allyl ester or a solution of such polymer in monomer to obtain increased viscosity.

A partially polymerized diallyl phthalate was produced as follows: Diallyl phthalate 50 parts, carbon tetrachloride 50 parts and benzoyl peroxide 1 part were refluxed with gentle boiling for 10 hours. The product was then poured into hot methanol when a soft taffy-like solid separated. This was triturated under hot methanol three times and dried overnight at room temperature giving a hard solid which can be powdered when cool.

The partially polymerized diallyl phthalate is soluble in monomer. A solution thus prepared containing 3% benzoyl peroxide based on the solvent monomer can be made over a range of viscosities. It is potentially reactive, readily hardening to a hard brittle solid by curing at 150° F. overnight, then raising the heat 15° per hour to 200° F. and holding this temperature for an hour or more. An advantage of this procedure is a reduction in the contraction of the bond. The contraction is due to the change from liquid to solid of different density. In the abrasive bond above a part of the bond is already a solid which results in a decrease in the contraction on curing. The solutions of polymer in monomer can be used to coat abrasives to backings or to bond abrasive particles into abrading articles.

The pulverized solid partially polymerized diallyl phthalate just described was used to bond silicon carbide abrasive.

Example IV

85% of 320 grit silicon carbide was uniformly mixed with 15% of pulverized partially polymerized diallyl phthalate. The mixture of powders was uniformly distributed into a wheel mold and hot pressed ½ hour at 350° F. and 2000 p. s. i. The wheel was oven cured for several hours at 300° F. The abrasive article thus obtained was softer in grade than that made by Example I because the procedure of this example permits the use of less bond. When abrasive and bond mixtures are cast sufficient bond is necessary to give a flowable mixture.

Example V 100 grams of 220 grit white fused alumina was mixed thoroughly with 39 grams diallyl phthalate containing 1.2 grams benzoyl peroxide. The mixture was poured into a mold and the abrasive allowed to settle with vibration. The excess bond amount to 14 grams was poured off and the casting cured according to the following schedule:

18 hrs.—150° F.
Raised 15°/hr. to 200° F.
2 hrs.—200° F.
2 hrs.—300° F.

The castings were then surfaced on an iron disc fed with loose abrasive to give very uniform abrasive blocks which were cut by a diamond cut off wheel into honing sticks 1/16" thick x ⅛" wide x 2"

long. These sticks gave an exceptionally fine finish in honing the ½" inside diameter of small wheel molds made of Nitralloy, a soft very tough steel.

Example VI

An abrasive wheel for polishing glass lenses was made as follows:

|  | Grams |
|---|---|
| Fine alumina polishing powder | 100 |
| Diallyl phthalate | 43 |
| Benzoyl peroxide | 1.29 |

The benzoyl peroxide was dissolved in the diallyl phthalate, heated to 70° C., and the abrasive was then stirred into the solution. A block was then cast and hardened as in previous examples. The block was then mounted in a lathe and turned by means of a hard carbide or diamond tool into a cylindrical wheel 1¼" inside diameter x 1¾" outside diameter x ¾" high with the top edge finished to a ¼" radius.

The physical properties of the various bonds may be varied by the use of different monomers and mixture of monomers as shown by the table below:

| Monomer | Gms. Monomer | Gms. Catalyst | Gms. AFF-3 Abrasive |
|---|---|---|---|
| Diallyl fumarate | 77 | 0.58 | 198 |
| Diallyl succinate containing .05% hydroquinone | 77 | 3.85 | 198 |

| Monomer | Modulus of Rupture, lbs./sq. in. | Impact inch pounds | Relative Penetration by Abrasive blast |
|---|---|---|---|
| Diallyl fumarate | 7,050 | 12.32 | 27 |
| Diallyl succinate containing .05% hydroquinone | 7,730 | 33.01 | 22 |

From the above is noted that the diallyl succinate bond containing inhibitor required more catalyst and gave a higher modulus of rupture, higher impact strength and more resistance to an abrasive blast.

Example VII

A sharpening stone was prepared from a mixture consisting of:

|  | Parts by weight |
|---|---|
| Di methyl vinyl carbinyl fumarate | 100 |
| Benzoyl peroxide | 3 |
| Fine alumina abrasive powder | 300 |

A smooth dispersion of abrasive in monomer is produced which was cast in a clean glass mold and cured by heating according to the previous examples. The polymerization of the monomer containing methyl vinyl carbinyl groups is quite similar to the allyl esters.

Instead of the allyl alcohol esters which I have described in the examples I may employ other unsaturated alcohols such as methyl vinyl carbinol, methallyl, crotyl, tiglyl, 2-chlorallyl, propargyl and phenyl allyl alcohol or diphenyl allyl or allene carbinol. Likewise, I may use other polybasic acids than those employed in the examples, such as succinic, glutaric, adipic, oxalic, malonic and sebacic. Similarly, other unsaturated acids than fumaric may be used, such as maleic, citraconic, itaconic, and vinylmalonic. In addition to the dibasic acids which I have mentioned I may also use tribasic acids such as tricarballylic, aconitic, or citric.

In place of the allyl esters, I may also use compounds containing two or more allyl groups attached by means of ether linkages. Typical compounds of this type are the allyl ethers of sugars, starch, sugar alcohols, polyvinyl alcohol, sucrose, sorbitol, glycerol, alpha-methyl glucoside and the like. The allyl ethers of the lower carbohydrates are liquids of comparatively low viscosity whereas the allyl ethers of macromolecules like starch and polyvinyl alcohol are soluble gummy materials. It is thus possible to get high boiling monomers suitable for cast abrasive bonds or viscous, low volatile adhesives suitable for the manufacture of coated abrasives. These ethers oxidize and polymerize to give insoluble, infusible products.

In place of the simple diallyl esters, I may use allyl esters of acid polymers such as the allyl esters of styrene-maleic anhydride heteropolymer. Other allyl compounds which I may use include allyl diethylene glycol carbonate, wherein two mols of allyl alcohol and one mol of glycol are combined with two carbonate groups to make a diallyl monomer, and the commercial allyl monomers known as "CR-39" and "CR-38" developed by the Columbia Chemical Division of the Pittsburgh Plate Glass Co.

In some instances I have found it to be desirable to employ two different esters. It is therefore to be understood that in practicing the present invention I may use combinations of two or more esters of unsaturated alcohols and polycarboxylic acid or, for that matter, I may employ with such ester an unsaturated polyester of a different type formed by the use of a saturated polyhydric alcohol with an unsaturated polycarboxylate acid such as diethylene glycol maleate or fumarate.

My invention is also adaptable to the employment of the usual modifications such as the inclusion of fillers, plasticizers, other types of bonding materials such as natural or synthetic resins, and may be otherwise practiced within the bounds as set forth in the appended claims.

I claim:

1. A molded abrasive product of substantial thickness comprising abrasive grains and a bond therefor containing as an essential ingredient a substantial proportion of a polymer of a simple ester formed by esterifying solely an unsaturated alcohol and a dicarboxylic acid.

2. A molded abrasive product of substantial thickness comprising abrasive grains and a bond therefor containing as an essential ingredient a substantial proportion of a polymer of a simple ester of allyl alcohol and a dicarboxylic acid.

3. A molded abrasive product of substantial thickness comprising abrasive grains and a bond therefor containing as an essential ingredient a substantial proportion of an infusible insoluble resin consisting of polymerized diallyl phthalate.

4. An abrasive article comprising abrasive grains and a bond therefor containing as an essential ingredient a substantial proportion of an infusible insoluble resin consisting of polymerized diallyl phthalate.

5. The method of making an abrasive article which comprises preparing a mixture comprising abrasive grains, diallyl phthalate, and a catalyst to cause the diallyl phthalate to polymerize when heated, forming an article from the mixture, and heating the article to polymerize the diallyl phthalate and convert it to an infusible insoluble condition.

6. The method of making an abrasive article which comprises preparing a mixture comprising abrasive grains, partially polymerized diallyl phthalate, and a catalyst to cause the partially polymerized diallyl phthalate to further polymerize when heated, forming an article from the mixture, and heating the article to further polymerize the diallyl phthalate and convert it to an infusible insoluble condition.

NORMAN P. ROBIE.

REFERENCES CITED

The following references are of record in the file of this patent:

UNITED STATES PATENTS

| Number | Name | Date |
|---|---|---|
| 2,097,803 | Sanford | Nov. 2, 1937 |
| 2,111,006 | Robie | Mar. 15, 1938 |
| 2,218,439 | Rothrock | Oct. 15, 1940 |
| 2,227,200 | Robie | Dec. 31, 1940 |
| 2,273,891 | Pollack et al. | Feb. 24, 1942 |
| 2,280,242 | Kropa et al. | Apr. 21, 1942 |
| 2,310,731 | D'Alelio | Feb. 9, 1943 |

Certificate of Correction

Patent No. 2,496,234 January 31, 1950

NORMAN P. ROBIE

It is hereby certified that errors appear in the printed specification of the above numbered patent requiring correction as follows:

Column 5, lines 11, 12, and 13, strike out "(overnight)"; column 6, line 65, for the word "amount" read *amounting*; column 8, line 39, for the syllable "boxylate" read *boxylic*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*